United States Patent
Thomas

(10) Patent No.: US 6,716,387 B2
(45) Date of Patent: Apr. 6, 2004

(54) PROCESS FOR PRESSURE ASSISTED MOLDING OF HOLLOW ARTICLES

(75) Inventor: Ronald Thomas, Chesterfield Township, MI (US)

(73) Assignee: Alliance Systems, Inc., Chesterfield, MI (US)

( * ) Notice: Subject to any disclaimer, the term of this patent is extended or adjusted under 35 U.S.C. 154(b) by 0 days.

(21) Appl. No.: 10/085,372

(22) Filed: Feb. 28, 2002

(65) Prior Publication Data

US 2002/0117783 A1 Aug. 29, 2002

Related U.S. Application Data

(60) Provisional application No. 60/272,156, filed on Feb. 28, 2001.

(51) Int. Cl.[7] .............................................. B29D 22/00
(52) U.S. Cl. ...................................................... 264/572
(58) Field of Search ........................................ 264/572

(56) References Cited

U.S. PATENT DOCUMENTS

| | | |
|---|---|---|
| 4,740,150 A | 4/1988 | Sayer |
| 5,039,463 A | 8/1991 | Loren |
| 5,047,183 A | 9/1991 | Eckardt et al. |
| 5,090,886 A | 2/1992 | Jaroschek |
| 5,118,455 A | 6/1992 | Loren |
| 5,162,230 A | 11/1992 | Zielger et al. |
| 5,200,127 A | 4/1993 | Nelson |
| 5,204,051 A | 4/1993 | Jaroschek |
| 5,222,514 A | 6/1993 | Klotz et al. |
| 5,295,800 A | 3/1994 | Nelson et al. |
| 5,344,596 A | 9/1994 | Hendry |
| 5,423,667 A | 6/1995 | Jaroschek |
| 5,443,378 A | 8/1995 | Jaroschek et al. |
| 5,482,669 A | 1/1996 | Shah |
| 5,705,107 A | 1/1998 | Kaneishi et al. |
| 5,728,325 A | 3/1998 | Blankenburg |
| 5,728,410 A | 3/1998 | Hendry |
| 5,759,479 A * | 6/1998 | Gotterbauer ................. 264/572 |
| 5,770,237 A | 6/1998 | Sayer et al. |
| 6,159,415 A | 12/2000 | Tanada |
| 6,372,177 B1 * | 4/2002 | Hildesson et al. ........... 264/572 |
| 6,579,489 B1 * | 6/2003 | Thomas ....................... 264/570 |
| 2001/0017433 A1 * | 8/2001 | Eckardt ........................ 264/572 |

* cited by examiner

Primary Examiner—Suzanne E. McDowell
(74) Attorney, Agent, or Firm—Dinnin & Dunn, P.C.

(57) ABSTRACT

The present invention provides a process for fluid assisted injection molding comprising the step of providing an injection molding apparatus having a mold body that defines a mold cavity. The process further comprises the steps of supplying a quantity of fluent plastic to the mold cavity, followed by injecting a fluid into the mold cavity. The fluid forms an expanding fluid pocket in the mold cavity, driving plastic to the furthest recesses of the mold and ensuring a smooth surface finish of the final molded product. A reservoir is selectively connectable to a plastic injection runner, and can be opened to the runner to receive molten plastic ejected by the introduction of the fluid to the mold cavity. When the reservoir is thusly connected, the pressure of the fluid forces the plastic through a supply passage, in a direction substantially opposite to its initial injection direction.

18 Claims, 2 Drawing Sheets

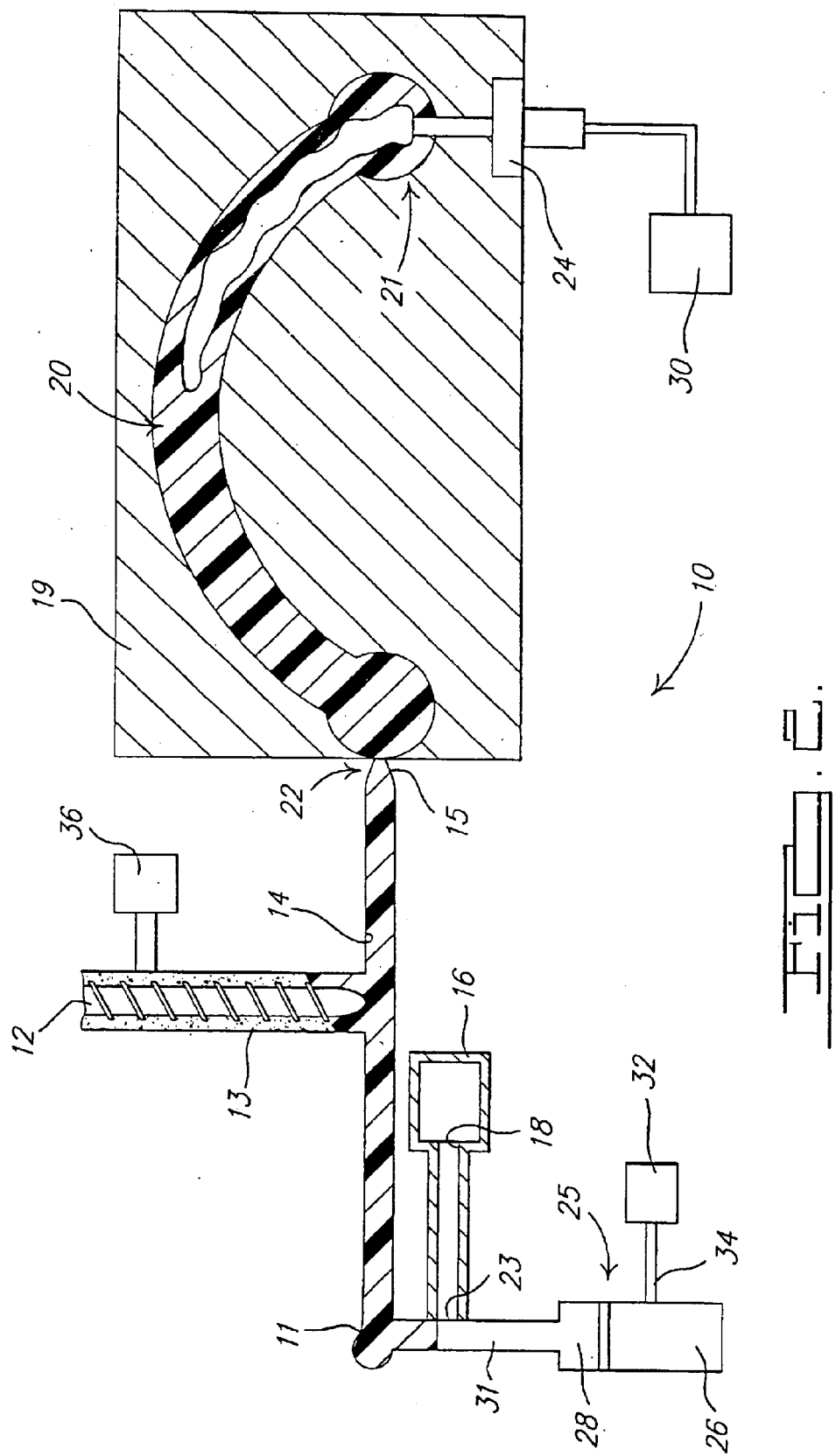

PROCESS FOR PRESSURE ASSISTED MOLDING OF HOLLOW ARTICLES

This Application Claims the Priority of U.S. Provisional Application No. 60/272,156 Filed Feb. 28, 2001.

TECHNICAL FIELD

The present invention relates generally to fluid assisted injection molding processes, and more particularly to such a process utilizing an overfill reservoir selectively connectable to a fluent plastic supply line.

BACKGROUND OF THE INVENTION

There are a wide variety of gas or fluid assisted injection molding apparatuses and processes available in the art. Injection molding generally comprises injecting a molten plastic under pressure (usually by a screw feed injector) into a closed two piece cavity. When the part cools, the mold pieces are separated and the part removed. There are various references to specific pressure profiles to best implement the molding process, and a plethora of plastic injection molding machines commercially available.

Gas or fluid assisted injection molding generally involves injecting gas into the fluid plastic material either during or after plastic injection to create a hollow within the part. This reduces the weight of the part and the cost of material used. More importantly, pressurizing the interior of the part forces the fluid plastic against the mold surface as it cools. When plastics cools, it shrinks, and tends and pull away from the mold surface, leaving unsightly sink marks. The cooling of the plastic within the mold also reduces the pressure of the plastic within the mold. There are a variety of gas or fluid assist controllers and equipment commercially available.

There is another variation of the injection process known generally as overflow, overspill, spillovers or similar names. This process generally involves injecting more plastic material into the mold cavity than the cavity will hold, and allowing material to flow into reservoirs at the remote ends of the plastic flow path to receive the excess. If the reservoir locations are chosen properly, the plastic must fill every bit of the mold cavity before the reservoirs are filled, thus ensuring complete mold fill out. Again, molding equipment utilizing the overflow concept is commercially available.

Some combinations of overflow and fluid injection have been attempted, generally to speed the fill out process or to intentionally dispel fluid plastic from the part interior to create a hollow part. These processes have generally proven unreliable (poor repeatability). The typical combination process injects gas at or near the plastic inlet, pushing the plastic toward the overspill at the far end(s) of the mold cavity. This results in a flow of the cooling resin toward a small gate located at the opposite end of the cavity. When the resin cools, it is much less viscous and tends to resist flowing through the overspill gate. The plastic's resistance to shear also increases with the decrease in temperature, adding further resistance to travel through the overspill gate, and causing the resin flow to stall at the overspill entrance. This "blockage," or area of greater resistance to flow, can lead to or cause a number of problems or undesirable conditions. For example, this situation often prompts operators to utilize unnecessarily high gas injection pressures to move the resin through the overspill gate. Further, this undesired resistance may localize high gloss areas over the channel.

Typically, when confronted by the resistance of the cooling resin at the over-spill gate, the gas will in effect migrate to "thin wall" sections of the plastic part causing quality/function problems. This is like blowing up a balloon with thin spots, the thicker areas will not stretch, causing the thin section to overstretch. As a result, parts are characterized by an increase in the resin wall thickness as the gas moves from the hotter gate area at the point of gas injection (more pliable resin is moved along by the gas) to the relatively cooler area at the end of the gas channel/entrance of the overspill (less pliable resin stays in place and is less affected by the gas). Further, if the amount of plastic flowing into the overspill is reduced, the amount of space the gas will occupy at a given pressure is similarly reduced, thus yielding a part heavier than desired. Further still, the use of gas injection at/near the point of plastic injection creates a need to have greater or even excessive gas injection delay times to insure that the hotter resin around the gate/pin is cooled sufficiently that the molten resin will not be blown off the gas pin. Similarly, longer gas injection delay times would also be necessary to ensure that the hotter resin around the gate/pin is cooled sufficiently so that the molten resin will not "foam up" (become mixed with resin). The higher the gas pressure to be used, the longer the injection delay required to avoid these problems.

U.S. Pat. No. 5,204,051 to Jaroschek is entitled "Process For The Injection Molding Of Fluid-Filled Plastic Bodies." In Jaroschek, a, flowable plastic melt is first injected into a mold cavity. After cooling of the plastic melt along the mold cavity walls, a fluid is injected in a manner such that the still-melted center of the resulting plastic body is expelled into a side cavity. Jaroschek states that the process can be undertaken in such a way that fluent plastic is forced back toward the plastic supply by the incoming fluid. Thus, the molten plastic supply could serve as the side cavity for receipt of the expelled plastic; however, it is first necessary to lift the sprue away from its seat to allow the plastic to pass, leaving a quantity of plastic between the sprue body and its seat.

SUMMARY OF THE INVENTION

In one aspect, an injection molding apparatus is provided. The injection molding apparatus includes a cavity for forming a hollow molded plastic part, a source of fluent plastic fluidly connectable to the cavity, and a runner for supplying fluent plastic from the source to the cavity. At least one fluid injection pin is provided and is mounted to the mold body and connectable to a fluid source. A reservoir is also provided and is positioned remote from the cavity, the reservoir is selectively connectable to the runner via a sub-runner. Finally, a valve is positioned adjacent a mouth of the sub-runner. The valve is operable between a first state at which the reservoir is fluidly connected to the runner and a second state at which the reservoir is blocked from fluid communication with the runner.

In another aspect, a process for injection molding of fluid filled plastic bodies is provided. The process includes the steps of providing an injection molding apparatus having a mold body that defines a mold cavity, and a source of flowable plastic material fluidly connectable to the mold cavity with a supply passage. At least one reservoir is also provided and is fluidly connectable to the supply passage with a control valve. At least one fluid injection pin is also provided and is connectable to a fluid source. The process further includes the steps of injecting a quantity of flowable plastic into an interior of the mold cavity through the supply passage, and cooling part of the injected plastic along the walls of the mold cavity, providing an interior of flowable plastic melt. In addition, the process includes the step of selectively expelling at least a portion of the interior of flowable plastic melt into the supply passage, and selectively expelling at least a portion of fluent plastic from the supply passage into the reservoir.

In yet another aspect, a method of forming a hollow injection molded plastic part is provided. The method includes the steps of providing a mold body having a mold cavity, connecting a source of fluent plastic to the mold cavity with a runner passage, and mounting at least one fluid injection pin to the mold body, and connecting the pin to a fluid source. The method further includes the steps of injecting a quantity of fluent plastic via the runner into the mold cavity, and injecting a quantity of fluid into the mold cavity, thereby expelling a portion of the quantity of fluent plastic to the runner, leaving a hollow plastic body around the periphery of the mold cavity. The method finally includes the step of selectively connecting the runner to a reservoir and expelling a quantity of fluent plastic to the reservoir.

BRIEF DESCRIPTION OF THE DRAWINGS

FIG. 2 is a partial sectioned side view of an apparatus similar to FIG. 1.

DETAILED DESCRIPTION

Figure 1:
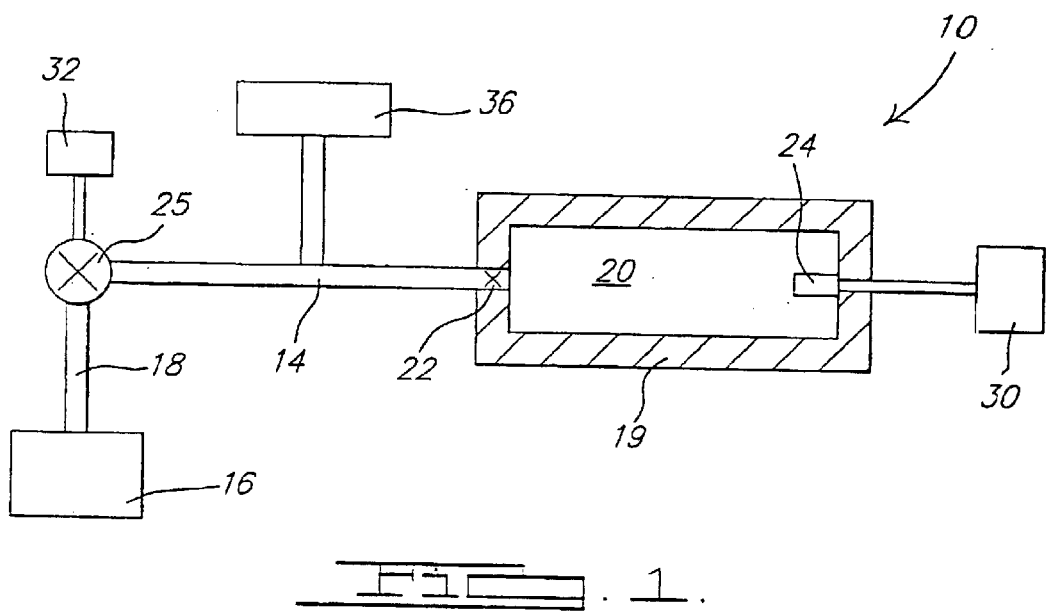
FIG. 1 is a system level diagram of a pressure-assisted injection molding apparatus according to the present invention.

Referring to FIG. 1, there is shown a system level diagram of an injection molding apparatus 10 for undertaking a pressure-assisted injection molding process according to the present invention. Apparatus 10 preferably includes a mold body 19, a fluent plastic source 36, a reservoir 16, and a fluid source 30. Fluent plastic source 36 is connected via a runner 14 to mold cavity 20 for supplying fluent plastic thereto. A gate 22 having a restricted diameter preferably connects runner 14 to cavity 20. A fluid injection pin 24, which is fluidly connected to a fluid source 30, extends into mold cavity 20, and can deliver fluid into an interior of cavity 20 when desired. Runner 14 can also fluidly connect mold cavity 20 to reservoir 16, which is positioned remotely from mold cavity 20, via a sub-runner 18. Fluid communication between reservoir 16 and runner 14 (and thus mold cavity 20) is initiated and terminated with a control valve 25. In the preferred embodiment, control valve 25 is hydraulically actuated with fluid from a hydraulic fluid source 32, however, it should be appreciated that control valve 25 could be actuated by pneumatic, electromagnetic, or some other means.

Referring to FIG. 2, there is shown a partial sectioned side view of apparatus 10 similar to that illustrated in FIG. 1. Apparatus 10 preferably includes a conventional threaded-shaft sprue 12 positioned in a delivery shaft 13 for delivering molten plastic to the mold. It should be appreciated, however, that a different style of extruder, piston, or some other system for delivering molten plastic might be used. Shaft 13 is connected to runner 14, which is preferably a substantially cylindrical passage having a tapered injection end 15 and an ejection end 17. Injection end 15 is positioned adjacent gate 22 in mold body 19. Mold body 19 is preferably metallic and has two separable halves (only one is illustrated), which when closed define mold cavity 20. Mold cavity 20 is illustrated in FIG. 2 as generally tube-shaped, however, it should be appreciated that mold cavity 20 might have any of a great number of different shapes, depending on the desired shape of the part to be molded therein. Fluid injection pin 24 is preferably positioned at a downstream end 21 of mold cavity 20, and extends partially into an interior of cavity 20.

Runner 14 is preferably fluidly connectable to sub-runner 18 at its ejection end 17. In the preferred embodiment, control valve 25 includes a hydraulically-controlled piston 28. Piston 28 preferably has a control surface 29 exposed to fluid pressure in a hydraulic cylinder 26, and a substantially cylindrical end portion 31. Piston 28 has an extended position at which end portion 31 blocks an open end 23 of sub-runner 18, blocking fluid communication between sub-runner 18 and runner 14, thereby blocking fluid communication between cavity 20 and reservoir 16. Piston 28 also has a retracted position at which end portion 31 does not block open end 23 and therefore allows fluid communication between sub-runner 18 and runner 14, and can be moved between its two respective positions by controlling the hydraulic pressure supplied to chamber 26. If desired, a biasing spring (not shown) may be positioned in chamber 26 to bias piston 28 toward its extended position.

When initiation of a typical pressure assisted injection molding cycle is desired, the separable halves of mold body 19 are closed and secured. Fluent plastic source 36 is preferably a conventional heated plastic supply, and delivers fluent plastic to sprue 12 in a conventional manner. In the embodiment shown in FIG. 2, sprue 12 is rotated to drive molten plastic through delivery shaft 13 and into runner 14. At cycle initiation, hydraulic piston 28 should be held at its extended position, blocking fluid communication between runner 14 and reservoir 16. The rotation of sprue 12 delivers molten plastic to runner 14 and substantially fills runner 14 relatively quickly, at which point the molten plastic begins to pass through gate 22, filling cavity 20. During the injection process, the heat and pressure of the plastic that follows through sprue 12 keeps the plastic in the runner fluid during the injection process. Further, the runner 14 itself becomes heated by the continuous flow of molten plastic and helps maintain the temperature of the molten plastic during subsequent cycles. As the plastic clears the gate, it rapidly loses pressure as it enters the mold cavity, and begins to cool. It is thus critical to quickly fill the mold cavity to ensure a smooth and even coverage of the mold surface. Plastic delivery preferably continues until mold cavity 20 is packed to the greatest pressure possible by the present plastic injection process. In other embodiments, as described below, however, plastic injection can be terminated prior to filling the cavity entirely.

Once cavity 20 has been packed to the desired condition, injection of a fluid under pressure through pin 24 can begin. In the preferred embodiment, a brief delay is allowed between the termination of plastic injection and the initiation of fluid injection, allowing the plastic to begin to solidify along the exterior mold surfaces, however, fluid injection may be initiated immediately after cessation of plastic injection if desired, or might even be initiated before plastic injection ends. There are myriad available pins for fluid injection, including Applicant's ANP-series gas pin. The initial injection pressure depends upon the size of the part, the mold, and the size of the desired hollow space. Since the initial pressure will occur at a point of substantial fill out, the hollow created by the fluid injection will be the result of: (1) the shrinkage in plastic; and (2) the more complete fill out or packing of plastic into the mold caused by the increased pressure. The fluid most commonly used for the initial pressurization is compressed air, however, it is contemplated that other fluids, for example compressed nitrogen gas or water, may be preferred for particular molding applications. The fluid may be heated, chilled, or injected at ambient temperatures. The injected fluid creates an expanding pocket or hollow in the mold, and the consequent rising pressure of the fluid drives plastic to the furthest recesses of the mold, forcing the plastic relatively tightly against the interior mold surfaces. In order to ensure an even part thickness and to maximize the quality of the surface finish, it is preferred to maintain the pressure within the part for 2 to 10 seconds after injection. It should be appreciated, however, that the pressure might be lowered or raised during this dwell portion of the cycle. Further, additional fluid may be injected to maintain cavity pressure lost due to plastic cooling and shrinkage.

During the filling of cavity 20, the injected plastic begins to cool, resulting in partial hardening of the plastic adjacent the internal mold surfaces, yet leaving a flowable, molten plastic melt portion in the center of the molded article. In addition to cooling and hardening of the plastic at the exterior of the molded article, the melt portion in the center of the mold undergoes a degree of cooling. In the embodiment shown in FIG. 2, once mold cavity 20 is substantially filled, the plastic which has remained in the mold longest, and thus undergone the greatest degree of cooling is the plastic filling the mold cavity closest to its downstream end 21. Consequently, the downstream volume of the interior melt portion is slightly cooler and more viscous than the volume closer to gate 22.

Because valve 25 preferably remains closed during plastic and fluid injection, the pressure in the molding apparatus can build considerably during injection of fluid. When the desired dwell time has elapsed, valve 25 is hydraulically actuated, opening fluid communication between runner 14 and sub-runner 18. Because mold cavity 20 is under pressure from the injected fluid, the opening of valve 25 causes the molten plastic in runner 14 to begin to flow through sub-runner 18 toward reservoir 16. As plastic flows through runner 14, molten plastic (the interior melt) begins to flow from cavity 20 through gate 22, and thenceforth to runner 14. In a preferred embodiment, the volume of runner 14 is approximately equal to or greater than the volume of molten plastic expelled from cavity 20. There are at least two advantages in bleeding off the fluid plastic by opening the run-off reservoir after pressure has been built up in the mold cavity. First, the movement of fluid plastic material is initiated after a cavity is established within the part. This results in a more even wall thickness of the molded part. Further, this results in a more laminar flow of the fluid plastic core, which results in more uniform part production. The distinction is somewhat like comparing the un-pressurized bleeding of fluid lines to purging the lines with a burst of air. Although the interior surface quality of the molded part is not critical, the purpose is to leave as uniform a deposit of plastic as possible upon the mold surface. The second advantage is that the dwell time allows the part surface to set up before the remaining fluid plastic is bled out, and thus the part surface is more resistant to the shear forces resulting from the flow of the fluid plastic toward the runner.

Once the desired quantity of plastic has been evacuated to reservoir 16, valve 25 is closed, allowing runner 14 to become packed with any additional plastic ejected from the mold. It is preferable to locate the fluid injection pin or pins at a point or points in the mold most downstream of the gate, while still allowing for a desired part thickness, as the drawing Figures illustrate, although it should be appreciated that the pin might be positioned elsewhere. Because the preferred arrangement ejects the interior melt from mold cavity 20 in an upstream direction, i.e. toward the plastic supply, the lesser-cooled portion of the melt positioned closest to gate 22 is ejected first, with the more downstream portion of the melt ejected later. Thus, with the hotter and less-viscous plastic ejected first, initiation of ejection is easier than in systems that eject the cooler plastic first. This is particularly advantageous where, as in the present invention, the bleeding of fluid plastic is delayed to allow for adequate surface curing of the part, thus decreasing the fluidity of the plastic on the interior of the part, particularly at the points remote from the gate. Bleeding the most fluid plastic from the mold first is the most efficient way to remove the greatest amount of still cooling fluid plastic and facilitates plastic ejection without the need for excessively high fluid injection pressures. This also reduces the chance of more-cooled/less-fluid plastic impeding the flow of less-cooled/more-fluid plastic toward and through the gate. Since the pin(s) 24 is/are located at the remote end(s) of the cavity, there is also less chance of flashing or fluid plastic encroachment into the pin. Further still, when runner 14 is packed with the ejected plastic material, the cooler and more viscous portion of the melt will occupy the upstream side of gate 22. Thus, upon opening of the respective halves of mold body 20 to remove the molded part, the plastic immediately adjacent the mold cavity (at runner 14's injection end 15) is relatively cooler and firmer than the plastic at the opposite end 17 of runner 14. This partially cooled plastic separates more cleanly from the molded part than hotter, less viscous plastic would, resulting in a cosmetically superior molded part.

It should be appreciated that the fluid may be injected via pin 24 prior to opening of valve 25, then halted, allowing the built-up pressure to drive plastic from the mold when valve 25 is opened. Alternatively, fluid may be injected before opening valve 25, as well as after the valve is opened. A third alternative involves initially supplying fluid to cavity 20, halting the fluid supply while a quantity of plastic is ejected, then again supplying fluid after a main portion of plastic has been ejected. Related schemes could be undertaken wherein valve 25 is operated to allow an initial pressure buildup (held closed), followed by a pressure drop (opened), then followed by another build (closed). The various possible fluid injection schemes are available for different mold and plastic characteristics, and considerable variation on the presently disclosed processes is possible without departing from the scope of the present invention. For instance, any of the fluid injection events could be undertaken with either a gas or a liquid, for instance water. The plastic injectors, mold cavities, runners, and cylinders are all known in the art. Suitable injection pins such as Applicant's ANP series gas pin or multi-fluid pin are commercially available, as are fluid injection controllers, such as Applicant's LGC series gas-assist controller, which can adjust the pressure and timing of fluid introduced into the chambers.

It should be understood that the present description is for illustrative purposes only and should not be construed to limit the scope of the present invention in any way. Thus, those skilled in the art will appreciate that various modifications could be made to the presently disclosed embodiments without departing from the intended spirit and scope of the present invention. Other aspects, features, and advantages will be apparent upon an examination of the attached drawing figures and appended claims.

What is claimed:

1. A process for injection molding of fluid filled plastic bodies in an apparatus having a mold cavity and a separate fluid reservoir, the process comprising the steps of:

connecting a source of flowable plastic material fluidly to the mold cavity with a supply passage;

positioning at least one fluid injection pin partially within the mold cavity, the fluid injection pin being connectable to a fluid source;

injecting a quantity of flowable plastic into an interior of the mold cavity through the supply passage;

cooling part of the plastic melt along walls of the mold cavity, thereby providing an interior of flowable, plastic melt;

injecting a quantity of fluid from the fluid source into the interior of flowable, plastic melt;

selectively expelling at least a portion of the interior of flowable, plastic melt into the supply passage; and selectively expelling at least a portion of fluent plastic from the supply passage into the reservoir.

2. The process of claim 1 further comprising the step of injecting a second quantity of fluid from said fluid source into the mold cavity.

3. The process of claim 1 further comprising the steps of injecting a plurality of discrete quantities of fluid from the fluid source into the mold cavity.

4. The process of claim 1 wherein the step of injecting a flowable plastic is characterized by injecting the flowable plastic material in a downstream direction; and the step of injecting a quantity of fluid is characterized by injecting the gas in an upstream direction to eject a portion of the flowable plastic from the mold.

5. The method of claim 1 wherein said fluid is a compressible fluid.

6. The method of claim 1 wherein said fluid is a non-compressible fluid.

7. The method of claim 1 wherein said fluid includes compressible and non-compressible fluids.

8. A process for injection molding of plastic bodies in a molding apparatus having a mold cavity, the process comprising the steps of:

injecting a quantity of flowable plastic into the mold cavity;

injecting a quantity of pressurized compressible fluid into the interior of said flowable plastic in said cavity, increasing the pressure within said cavity;

selectively connecting the mold cavity with a reservoir after cessation of pressurized fluid injection, so that a portion of said flowable plastic flows from the mold cavity.

9. The process of claim 8 wherein said step of selectively connecting is characterized by actuating a control valve to fluidly connect the mold cavity with the reservoir.

10. The process of claim 9 wherein said portion of the interior of flowable plastic flows from the mold cavity in the direction of said injection of flowable plastic.

11. The process of claim 9 wherein said portion of the interior of flowable plastic flows from the mold cavity in an upstream direction opposite the direction of said injection of flowable plastic.

12. A process for injection molding of hollow articles in an apparatus having a mold cavity and a reservoir, the process comprising the steps of:

injecting fluent plastic into the apparatus;

injecting a pressurized compressible fluid into the fluent plastic, the fluid forming a pocket of pressurized fluid therein;

maintaining fluid pressure in the mold a predetermined duration after cessation of said fluid injection;

selectively connecting the mold cavity to the reservoir, so that a portion of the fluent plastic flows to the reservoir.

13. The process of claim 12 wherein the predetermined duration is about two seconds to about ten seconds.

14. The process of claim 12 wherein the step of selectively connecting the mold cavity to the reservoir includes actuating a control valve to fluidly connect the mold cavity therewith.

15. The process of claim 12 wherein the portion of fluent plastic flows to the reservoir in a downstream direction.

16. The process of claim 12 wherein said portion of the fluent plastic flows from the mold cavity in the direction of said injection of fluent plastic.

17. The process of claim 12 wherein said portion of the fluent plastic flows from the mold cavity in a direction opposite to the direction of said injection of fluent plastic.

18. A method for injection molding a part having at least one cavity therein, comprising the steps of;

injecting thermoplastic melt from an injection unit along a melt flow path into a cavity of an injection molding tool to partially fill the cavity;

selectively isolating said melt flow path from said cavity;

injecting a compressible fluid into the thermoplastic melt; and then selectively connecting said melt flow path with said cavity so that a portion of said thermoplastic melt flows from said cavity.

* * * * *

(12) EX PARTE REEXAMINATION CERTIFICATE (5781st)
United States Patent
Thomas

(10) Number: US 6,716,387 C1
(45) Certificate Issued: Jun. 12, 2007

(54) PROCESS FOR PRESSURE ASSISTED MOLDING OF HOLLOW ARTICLES

(75) Inventor: Ronald Thomas, Chesterfield Township, MI (US)

(73) Assignee: Alliance Systems, Inc., Chesterfield, MI (US)

Reexamination Request:
No. 90/007,014, Apr. 23, 2004

Reexamination Certificate for:
Patent No.: 6,716,387
Issued: Apr. 6, 2004
Appl. No.: 10/085,372
Filed: Feb. 28, 2002

Related U.S. Application Data

(60) Provisional application No. 60/272,156, filed on Feb. 28, 2001.

(51) Int. Cl.
*B29C 45/17* (2006.01)

(52) U.S. Cl. .................................................. 264/572
(58) Field of Classification Search .................. None
See application file for complete search history.

(56) References Cited

U.S. PATENT DOCUMENTS

| | | | |
|---|---|---|---|
| 2,331,688 A | 10/1943 | Hobson |
| 2,345,144 A | 3/1944 | Opavsky |
| 2,714,747 A | 8/1955 | Lindemann |
| 2,714,748 A | 8/1955 | Stimemann |
| 3,021,559 A | 2/1962 | Strong |
| 3,044,118 A | 7/1962 | Bernhardt |
| 3,135,640 A | 6/1964 | Kepka |
| 3,687,582 A | 8/1972 | Hendry et al. |
| 3,966,372 A | 6/1976 | Yasuike et al. |
| 4,033,710 A | 7/1977 | Hanning |
| 4,078,875 A | 3/1978 | Eckardt |
| 4,082,226 A | 4/1978 | Appleman et al. |
| 4,091,057 A | 5/1978 | Weber |
| 4,092,389 A | 5/1978 | Sakurai |
| 4,101,617 A | 7/1978 | Friederich |
| 4,104,353 A | 8/1978 | Monnet |
| 4,106,887 A | 8/1978 | Yasuike et al. |
| 4,129,635 A | 12/1978 | Yasuike et al. |
| 4,136,220 A | 1/1979 | Olabisi |
| 4,140,672 A | 2/1979 | Kataoka |
| 4,208,368 A | 6/1980 | Egli |
| 4,234,642 A | 11/1980 | Olabisi |
| 4,247,515 A | 1/1981 | Olabisi |
| 4,255,368 A | 3/1981 | Olabisi |
| 4,333,608 A | 6/1982 | Hendry |
| 4,357,296 A | 11/1982 | Hafele |
| 4,474,717 A | 10/1984 | Hendry |
| 4,555,225 A | 11/1985 | Hendry |
| 4,601,870 A | 7/1986 | Sasaki |
| 4,604,044 A | 8/1986 | Hafele |
| 4,740,150 A | 4/1988 | Sayer |
| 4,781,554 A | 11/1988 | Hendry |

(Continued)

FOREIGN PATENT DOCUMENTS

| CA | 2125623 | 12/1994 |
|---|---|---|
| DE | 651 725 | 10/1937 |
| DE | 1194127 | 6/1965 |

(Continued)

*Primary Examiner*—Kiley Stoner

(57) ABSTRACT

The present invention provides a process for fluid assisted injection molding comprising the step of providing an injection molding apparatus having a mold body that defines a mold cavity The process further comprises the steps of supplying a quantity of fluent plastic to the mold cavity, followed by injecting a fluid into the mold cavity. The fluid forms an expanding fluid pocket in the mold cavity, driving plastic to the furthest recesses of the mold and ensuring a smooth surface finish of the final molded product. A reservoir is selectively connectable to a plastic injection runner, and can be opened to the runner to receive molten plastic ejected by the introduction of the fluid to the mold cavity. When the reservoir is thusly connected, the pressure of the fluid forces the plastic through a supply passage, in a direction substantially opposite to its initial injection direction.

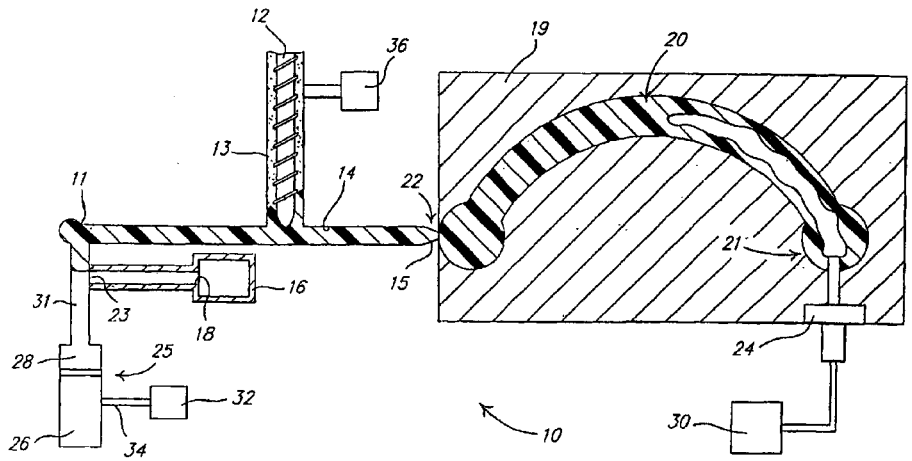

U.S. PATENT DOCUMENTS

| | | |
|---|---|---|
| 5,028,377 A | 7/1991 | Hendry |
| 5,069,858 A | 12/1991 | Hendry |
| 5,069,859 A | 12/1991 | Loren |
| 5,090,886 A | 2/1992 | Jaroschek |
| 5,098,637 A | 3/1992 | Hendry |
| 5,204,050 A | 4/1993 | Loren |
| 5,204,051 A | 4/1993 | Jaroschek |
| 5,423,667 A | 6/1995 | Jaroschek |
| 5,607,640 A | 3/1997 | Hendry |
| 5,759,479 A | 6/1998 | Gotterbauer |
| 5,885,518 A | 3/1999 | Hendry |
| 5,928,677 A | 7/1999 | Gosdin |
| 6,019,918 A | 2/2000 | Guergov |
| 6,159,415 A | 12/2000 | Tanada |
| 6,354,826 B1 | 3/2002 | Thomas |
| 6,372,177 B1 | 4/2002 | Hildesson et al. |
| 6,375,892 B2 | 4/2002 | Thomas |
| 6,576,170 B1 | 6/2003 | Nunnery et al. |
| 6,579,489 B1 | 6/2003 | Thomas |
| 6,602,460 B2 | 8/2003 | Thomas et al. |
| 2003/0011110 A1 | 1/2003 | Pearson |
| 2003/0011111 A1 | 1/2003 | Pearson |

FOREIGN PATENT DOCUMENTS

| | | |
|---|---|---|
| DE | 2 159 344 | 5/1972 |
| DE | 2 108 546 | 8/1972 |
| DE | 2651725 | 4/1978 |
| DE | 3444532 | 6/1986 |
| DE | 40 02 503 | 1/1990 |
| DE | 39 13 109 A1 | 10/1990 |
| DE | 40 33 298 | 5/1991 |
| DE | 43 34 012 | 10/1993 |
| DE | 195 31 709 A1 | 3/1997 |
| DE | 10128458 | 2/2003 |
| EP | 0 289 230 | 11/1988 |
| EP | 0 309 182 | 3/1989 |
| EP | 0 309 257 | 3/1989 |
| EP | 0 321 117 | 6/1989 |
| EP | 0321117 | 6/1989 |
| EP | 0 402 730 | 6/1990 |
| EP | 0628395 | 6/1994 |
| EP | 0 950 493 | 10/1999 |
| FR | 1145411 | 10/1957 |
| FR | 2256021 | 7/1975 |
| GB | 1 460 101 | 12/1976 |
| GB | 1 487 187 | 9/1977 |
| GB | 2 100 661 | 1/1983 |
| GB | 2 122 130 | 1/1984 |
| GB | 2139548 | 11/1984 |
| GB | 2315050 | 1/1998 |
| JP | 50-74660 | 6/1975 |
| JP | 5714968 | 6/1975 |
| JP | 3009820 | 1/1991 |
| JP | 3-121820 | 5/1991 |
| JP | 4-62118 | 2/1992 |
| JP | 5-96560 A | 4/1993 |
| JP | 06155501 | 6/1994 |
| JP | 06297522 | 10/1994 |
| JP | 10291227 | 11/1998 |
| JP | 113333876 | 12/1999 |
| WO | WO 96/34731 | 11/1996 |

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

\* \* \* \* \*

(12) EX PARTE REEXAMINATION CERTIFICATE (10333rd)
United States Patent
Thomas

(10) Number: US 6,716,387 C2
(45) Certificate Issued: Oct. 15, 2014

(54) PROCESS FOR PRESSURE ASSISTED MOLDING OF HOLLOW ARTICLES

(75) Inventor: Ronald Thomas, Chesterfield Township, MI (US)

(73) Assignee: Cinpres Gas Injection Ltd., Middlewich (GB)

Reexamination Request:
No. 90/012,805, Mar. 12, 2013
No. 90/013,071, Dec. 2, 2013

Reexamination Certificate for:
Patent No.: 6,716,387
Issued: Apr. 6, 2004
Appl. No.: 10/085,372
Filed: Feb. 28, 2002

Reexamination Certificate C1 6,716,387 issued Jun. 12, 2007

Related U.S. Application Data

(60) Provisional application No. 60/272,156, filed on Feb. 28, 2001.

(51) Int. Cl.
*B29C 45/17* (2006.01)

(52) U.S. Cl.
CPC ..... *B29C 45/1711* (2013.01); *B29C 2045/1728* (2013.01)

USPC .......................................................... 264/572
(58) Field of Classification Search
None
See application file for complete search history.

(56) References Cited

To view the complete listing of prior art documents cited during the proceedings for Reexamination Control Numbers 90/012,805 and 90/013,071, please refer to the USPTO's public Patent Application Information Retrieval (PAIR) system under the Display References tab.

*Primary Examiner* — Sean E Vincent

(57) ABSTRACT

The present invention provides a process for fluid assisted injection molding comprising the step of providing an injection molding apparatus having a mold body that defines a mold cavity The process further comprises the steps of supplying a quantity of fluent plastic to the mold cavity, followed by injecting a fluid into the mold cavity. The fluid forms an expanding fluid pocket in the mold cavity, driving plastic to the furthest recesses of the mold and ensuring a smooth surface finish of the final molded product. A reservoir is selectively connectable to a plastic injection runner, and can be opened to the runner to receive molten plastic ejected by the introduction of the fluid to the mold cavity. When the reservoir is thusly connected, the pressure of the fluid forces the plastic through a supply passage, in a direction substantially opposite to its initial injection direction.

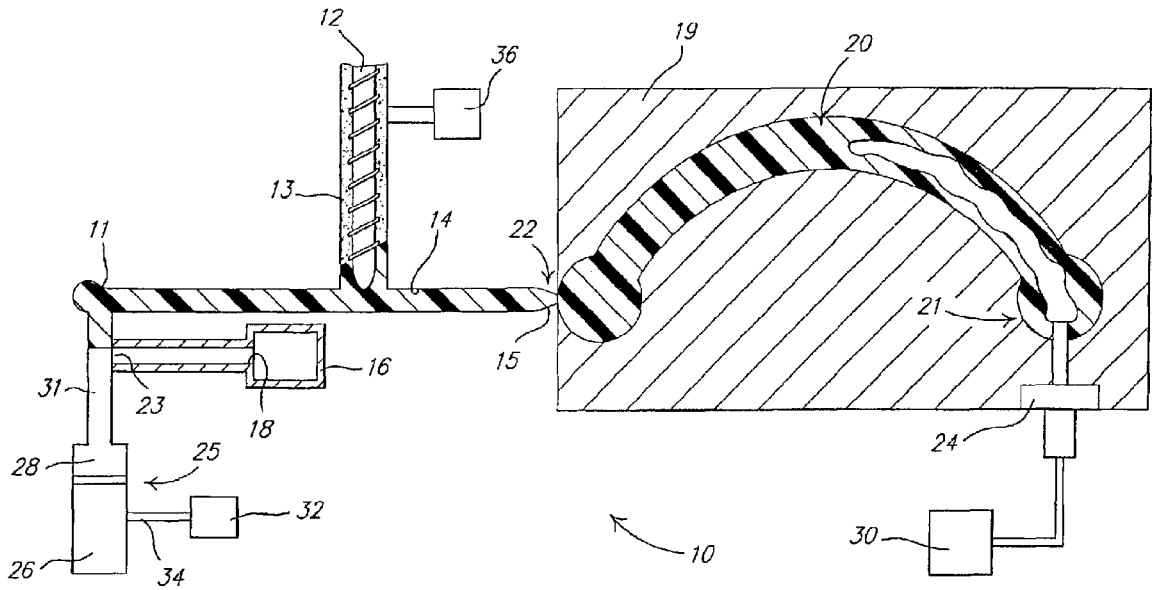

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 4-7 and 18 is confirmed.

Claims 8-10 and 13-17 are cancelled.

Claims 3, 11 and 12 are determined to be patentable as amended.

New claims 19-22 are added and determined to be patentable.

3. The process of claim 1 [further comprising the steps of injecting a plurality of discrete quantities of fluid from the fluid source into the mold cavity] *wherein the step of selectively expelling at least a portion of fluent plastic further comprises the step of actuating a control valve to selectively fluidly connect the supply passage with the reservoir.*

11. [The process of claim 9] *A process for injection molding of plastic bodies in a molding apparatus having a mold cavity, the process comprising the steps of:*

*injecting a quantity of flowable plastic into the mold cavity;*

*injecting a quantity of pressurized compressible fluid into the interior of said flowable plastic in said cavity, increasing the pressure within said cavity;*

*selectively connecting the mold cavity with a reservoir after cessation of pressurized fluid injection, so that a portion of said flowable plastic flows from the mold cavity;*

*wherein said step of selectively connecting is characterized by actuating a control valve to fluidly connect the mold cavity with the reservoir; and*

*wherein said portion of the interior of flowable plastic flows from the mold cavity in an upstream direction opposite the direction of said injection of flowable plastic.*

12. A process for injection molding of hollow articles in an apparatus having a mold cavity and a reservoir, the process comprising the steps of:

injecting fluent plastic into *a supply passageway connected to the mold cavity in* the apparatus *in order to at least partially fill the mold cavity*;

injecting a pressurized compressible fluid into the fluent plastic, the fluid forming a pocket of pressurized fluid therein;

maintaining fluid pressure in the mold a predetermined duration after cessation of said fluid injection;

selectively connecting the [mold cavity] *supply passageway* to the reservoir *by actuating a control valve to fluidly connect the mold cavity with the reservoir*, so that a portion of the fluent plastic flows [to] *out of the mold cavity, back out through the supply passageway and into* the reservoir.

*19. The process of claim 18 wherein the step of injecting a quantity of fluid further comprises injecting a gas to a downstream end of the mold cavity.*

*20. The process of claim 1 wherein the step of injecting a quantity of fluid further comprises injecting a gas at a downstream end of the mold cavity.*

*21. The process of claim 20 wherein the step of injecting the gas at the downstream end of the mold cavity includes injecting through a pin which extends partially into the mold.*

*22. The process of claim 18 wherein said portion of the fluent plastic flows from the mold cavity in a direction opposite to the direction of said injection of fluent plastic.*

\* \* \* \* \*